(No Model.)

A. BENSON.
SCREW DRIVER.

No. 277,202. Patented May 8, 1883.

Witnesses;
Carl J. Malmberg
Albert A. Barker

Inventor;
August Benson

UNITED STATES PATENT OFFICE.

AUGUST BENSON, OF WORCESTER, MASSACHUSETTS.

SCREW-DRIVER.

SPECIFICATION forming part of Letters Patent No. 277,202, dated May 8, 1883.

Application filed March 29, 1883. (No model.)

*To all whom it may concern:*

Be it known that I, AUGUST BENSON, of Worcester, in the county of Worcester and State of Massachusetts, have invented certain new and useful Improvements in Screw-Drivers; and I do hereby declare that the following is a full, clear, and exact description of the same, reference being had to the accompanying drawings, forming a part of this specification, and in which—

Figure 1:
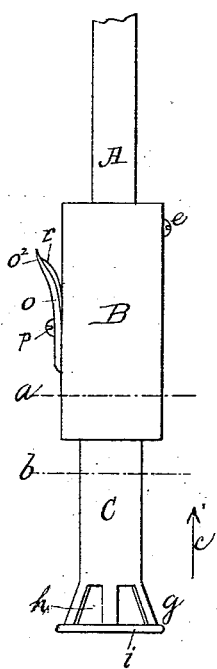
Figure 2:
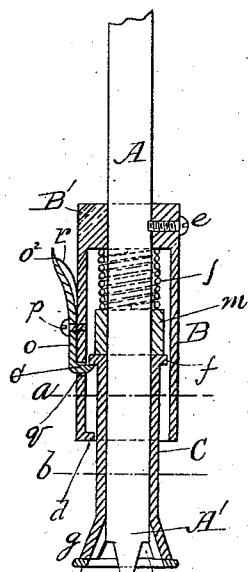
Figure 3:
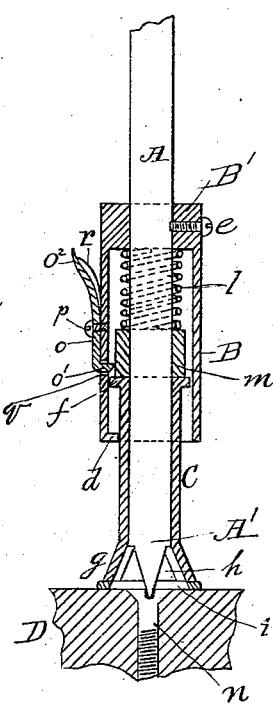
Figure 4:
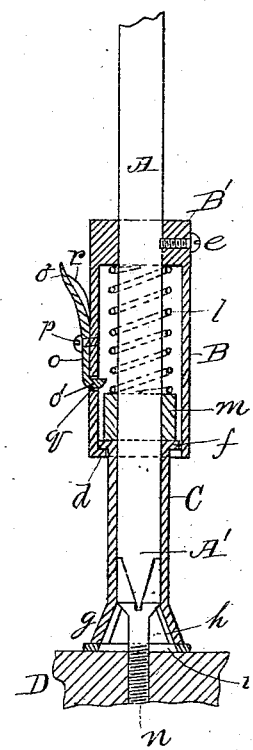
Figure 5:
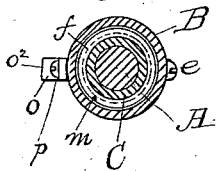
Figure 6:
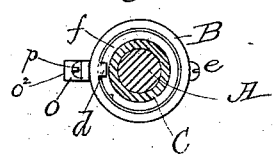

Figure 1 represents a side view of a screw-driver with my improvements applied thereto. Figs. 2, 3, and 4 represent central vertical sections of the screw-driver shown in Fig. 1, showing it in different positions, as hereinafter more fully described; and Figs. 5 and 6 represent cross-sections on lines $a\,b$, respectively, Figs. 1 and 2, looking in the direction of arrow $c$.

To enable those skilled in the art to which my invention belongs to make and use the same, I will proceed to describe it more in detail.

In the drawings, A represents the shank of an ordinary screw-driver, which is provided with the wedge-shaped end A', for inserting it into the slot of the screw to which it is applied.

The part B represents a tube or casing, which is provided at one end with the hub or bearing part B', and at the other end with the flange or projection $d$. Said tube or casing B is rigidly fastened to the shank of the screw-driver by means of a holding-screw, $e$, which is passed through the hub or bearing part B', and extended a short distance into said shank. If preferred, any other suitable method of fastening the same may be adopted.

A smaller tube, C, is also arranged over the shank A, which is fitted to slide up into the larger casing or tube, B. Said tube C is provided upon its inner end with a circular flange, $f$, and at its outer end with a flaring or trumpet-shaped end $g$, which is in turn provided with lateral openings $h$, and with a padding, $i$, of rubber, felt, or similar soft material. The purpose of the trumpet-shaped end $g$ is to hold the end of the screw-driver in position over the screw, so as to facilitate the operation of applying the wedge-shaped end A' to the slot in the screw, and of holding the same in said slot until the screw is driven in, without necessitating any unusual care or observation on the part of the person using the screw-driver, the only attention required being to keep said screw-driver about upon a line with the screw being operated upon. Openings $h$, which may be made of any desired shape, are for observing the progress of the screw, so as to know when it is driven in to the proper distance. The pad $i$ is for preventing the end of the screw-driver from marring the surface of polished or otherwise finished wook-work requiring screws to be inserted in the same. Flange $d$ is for preventing the tube C from slipping out of casing B.

In order that the tube C may adjust itself to the forward motion of the shank and screw in driving the latter in, I arrange a spiral spring, $l$, over said shank A between the hub B' and collar $m$, which latter is fitted loosely over the shank and has a bearing against the inner end of said tube. By this arrangement it will be seen that as the screw $n$ is driven in, as shown in Figs. 3 and 4 of the drawings, and the flaring end comes in contact with the wood-work D, the spring $l$ allows the tube to be sprung back so that the screw may be turned down to the surface of the wood-work, as shown in Fig. 3. The end of the screw-driver is kept from slipping out of the slot of the screw after the flaring end comes against the surface of the wood-work, and the screw-head has left the inner surface of said flaring end, by the friction of the pad $i$ upon the wood-work, which holds the end from slipping, especially when rubber is used for padding said end.

The adjustable tube C may be fastened a short distance back from the point of the screw-driver, as shown in Fig. 2, when it is desirable to use the screw-driver without the adjustable holding end $g$, by means of the hook $o$, which is hinged at $p$ to the outer casing, B. The hooked end $o'$ is depressed so as to keep it in the position shown by full lines in the drawings, with its hook inserted in the opening $q$ of the outer casing, by means of the flat spring $r$.

When it is desired to free the tube from hooked end $o'$, which holds against the flange $f$, before described, the person using the screw-driver presses upon the outer end, $o^2$, of the hinged hook $o$, thereby bringing the flaring end over the head of the screw, as before described.

My improved screw-driver is more especially designed for use in applying screws to cabinetwork and other kinds of fine-finished woodwork, although it will be found convenient for coarser kinds of work. In practice it will be made of different sizes to fit screws from the smallest to the largest sizes; but one size will fit several sizes of screws, owing to the flaring shape of the end $g$, as before described.

Having described my improvements in screw-drivers, what I claim therein as new and of my invention, and desire to secure by Letters Patent, is—

The combination of the shank A, provided with the wedge-shaped point A', with tube or casing B, adjustable tube C, collar $m$, spiral spring $l$, hinged hook $o$, and spring $r$, all constructed, fastened, and arranged to operate substantially as shown and described, for the purposes stated.

AUGUST BENSON.

Witnesses:
CARL J. MALMBERG,
ALBERT A. BARKER.